United States Patent
Sirohi et al.

(10) Patent No.: US 6,773,734 B2
(45) Date of Patent: Aug. 10, 2004

(54) PROCESS OF MAKING FOOD BAR

(75) Inventors: Dhan Pal Sirohi, Pully (CH); Birgit Sievert, Epalinges (CH); Jean-Jacques Desjardins, Yens (CH); Gilbert Geoffroy, La Tour-de-Treme (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/386,224

(22) Filed: Mar. 11, 2003

(65) Prior Publication Data

US 2003/0157223 A1 Aug. 21, 2003

Related U.S. Application Data

(62) Division of application No. 09/838,510, filed on Apr. 19, 2001, now abandoned.

(30) Foreign Application Priority Data

May 1, 2000 (EP) ............................................. 00201548

(51) Int. Cl.$^7$ ................................................. A23L 1/10
(52) U.S. Cl. ........................... 426/89; 426/94; 426/285; 426/516; 426/618; 426/620

(58) Field of Search ........................... 426/94, 89, 302, 426/285, 618, 620, 516

(56) References Cited

U.S. PATENT DOCUMENTS

| 2,437,150 A | 3/1948 | Berg .............................. 99/93 |
| 2,824,806 A | 1/1958 | Matz .............................. 99/83 |
| 3,431,112 A | 3/1969 | Durst .............................. 99/1 |
| 3,903,308 A | 9/1975 | Ode .............................. 426/93 |
| 4,451,488 A | 5/1984 | Cook et al. ................... 426/89 |
| 6,033,696 A | 3/2000 | Aebischer et al. ............ 426/94 |

FOREIGN PATENT DOCUMENTS

EP  0 908 106 A1  4/1999

Primary Examiner—Lien Tran
(74) Attorney, Agent, or Firm—Winston & Strawn LLP

(57) ABSTRACT

A process for manufacturing the ready-to-eat food bar. The ready-to-eat food bar produced by the present process includes agglomerated particles of one or more cereal bases is provided. The cereal bases include primarily amalyceous materials and optionally milk solids. The agglomerated particles are coated with a binder which includes sugars, milk solids, humectants or fat and optionally milk solids.

16 Claims, No Drawings

PROCESS OF MAKING FOOD BAR

CROSS REFERENCE TO RELATED APPLICATIONS

This application is a division of application Ser. No. 09/838,510, filed Apr. 19, 2001 now abandoned, the content of which is expressly incorporated herein by reference thereto.

FIELD OF INVENTION

The present invention relates to a process of making ready-to-eat food bar.

BACKGROUND OF THE ART

U.S. Pat. No. 4,650,685 to Persson et al. discloses a biscuit comprising agglomerated granules of a cooked-extruded base coated with a binder, the base comprising from 40 to 80 parts by weight of cereal flour, up to 20 parts sucrose and from 0.5 to 3 parts of oil or fat, and the binder comprising from 8 to 30 parts by weight of sucrose and/or mixtures of glucose and its polymers.

PCT Application W089/04121 assigned to HEINZ SCHAAF OHG discloses a process for manufacturing cereals by cooking-extruding a mixture of cereal material, vegetable and/or fruits with a partial amount of sugar and milk, cutting the expanded rope of cooked-extruded mixture into pieces having a large surface, spraying an aqueous suspension of sugar and milk onto the just cut, hot and moist pieces, coating the moistened pieces with a remaining part of components in powder form and drying the coated pieces.

SUMMARY OF THE INVENTION

The present invention relate a process for manufacturing the ready-to-eat food bar. This process includes the steps of preparing a dry mixture of particles of one or more cooked cereal bases which includes mainly amylaceous materials and optionally milk solids, mixing the dry mixture with a binder having sugars, milk solids, humectants and fat and forming the mass thus obtained into a bar shape.

The ready-to-eat food bar of the present invention includes agglomerated particles of amylaceous material, sugars and optionally milk solids. The food bar of the invention is nutritionally valuable and has a soft texture while retaining the crunchiness of cereal. The amylaceous material of the ready-to-eat food bar of the invention includes one or more cooked cereal bases which are coated with a binder. Advantageously, the binder includes sugars, milk solids, humectants and fat.

It has surprisingly been found that it was possible in this way to provide a food bar which is ready-to-eat, namely, it can be eaten just by scrunching it, is nutritionally valuable and has a soft texture while retaining the crunchiness of cereal.

Other improvements which the present invention provides over the prior art will be identified as a result of the following description which sets forth the preferred embodiments of the present invention. The description is not in any way intended to limit the scope of the present invention, but rather only to provide the working example of the present preferred embodiments. The scope of the present invention will be pointed out in the appended claims.

DETAILED DESCRIPTION OF THE PREFERRED EMBODIMENTS

In the present context, the expression "being nutritionally valuable" means a food bar which is rich in milk protein and calcium and which is based on amylaceous materials and sugar comprising, in percent by weight, from about 5.5% to about 27.5% of nonfat milk solids and from about 2.5% to about 25% of milk fat and/or vegetable fat.

In addition to relatively small amounts of each of residual water, ash, dietary fibers, vitamins and minerals, the present food bar can generally comprise, in percent by weight, from about 4% to about 12% of protein, from about 50% to about 80% of available carbohydrate and from about 2.5 to about 25% of fat.

The expression "has a soft texture while retaining the crunchiness of cereal" means that the cereal particles are crunchy within the bar while the binder, namely the continuous phase of the bar is soft.

The expression "particles of cooked cereal bases" covers, for example, any possible kind of cereal in piece form such as rolled cereals, gun puffed grains, cereal flakes and/or cooked-extruded cereals.

The term "food bar" means a food product having a massive shape which can be eaten by hand, no limit being set as to the choice of the shape which can be for example, a bar as well as a stick, a ball, a heart, a star, a bear or a banana.

The present food bar can include from about 5.5% to about 27.5% of nonfat milk solids, from about 2.5% to about 25% of milk fat and/or vegetable fat, from about 30% to about 60% of amylaceous material, from about 5% to about 30% of sugars, from about 2.5% to about 15% of humectants and from about 1.0% to about 7.0% of residual water.

The present food bar can further comprise up to about 3% of additional calcium, preferably in form of calcium carbonate or milk calcium, in addition to the calcium already present in the nonfat milk solids.

The food bar can also further comprise added vitamins, minerals and/or a source of dietary fibers.

The milk solids can be incorporated into the food bar in two parts, a first part being incorporated into the cooked cereal basis and a second part being incorporated into the binder, or in one part, all incorporated into the binder.

The nonfat milk solids in the cooked-extruded bases can be powdered skimmed milk.

The milk solids in the binder can be milk solids from fresh milk, milk solids from condensed milk and/or milk powder.

The milk fat and/or vegetable fat can be, for example, butter oil and/or vegetable fat such as partially hydrogenated sunflower or rape seed fat having a melting point of from about 33° C. to about 39° C.

The amylaceous material useful in the present invention includes, without limitation, a cereal flour, a starch and/or maltodextrin.

The cereal flour can be, for example, wheat, barley, oat, rice and/or corn flour.

The starch can be a native starch obtained from wheat, barley, rice and/or corn, preferably, high amylose starch.

Useful sugars for the present invention include, without limitation, sucrose, dextrose, fructose, glucose syrup, invert sugar and/or maltose syrup in dry or liquid form.

The possible source of fiber material can be without limitation a cereal bran.

Beside sugars and milk solids, the binder comprises humectants and it can further comprise emulsifiers.

The humectants can be glycerol and/or sorbitol.

The emulsifier can be one or more mono- or di-glycerides of edible fatty acids, preferably of vegetable origin, or lecithin.

Natural and/or artificial antioxydants can also be added in order to prolong the shelflife of the bar, such as tocopherols, BHA, BHT and mixtures thereof, for example.

The Process For Manufacturing the Food Bar

As stated above, the present process for manufacturing a ready-to-eat food bar includes preparing a dry mixture of particles of one or more cooked cereal bases, which bases include primarily amylaceous materials and optionally milk solids; mixing the dry mixture with a binder which comprises primarily sugars, milk solids, humectants and fat and forming the mass thus obtained into a bar shape.

Preparing Particles of Cooked Cereal Bases

Particles of cooked cereal bases can be any of those known to the man skilled in the art, including, without limitation, rolled cereals, gun puffed grains, cereal flakes and/or cooked-extruded cereals.

Rolled cereals can be prepared by cooking grains (whole or grits) with a liquor comprising sugar, malt, salt and vitamins, partially drying, rolling and flaking them.

Puffed grains can be prepared for example, by puffing whole grains of wheat or rice in a gun or in an oven.

Cereal flakes are prepared by methods, including, without limitation, cooking cereal grits or grains with a liquor, forming pellets out of the cooked mass thus obtained, rolling, toasting and optionally them with sugar.

Cooked-extruded cereals are prepared by cooking-extruding-expanding a mixture mainly comprising amylaceous materials and optionally milk solids, thus obtaining a rope of a thermoplastic mass having a porous texture, cutting the rope into pieces and optionally coating the pieces with sugar.

The preferred cooked-extruded-expanded cereals can be prepared by cooking-extruding-expanding at about 120° C. to about 170° C. under about 40 bar to 160 bar for about 5 to about 50 seconds a mixture comprising, in parts by weight, up to about 27.5 parts of nonfat milk solids, up to about 12.5 parts of milk fat and/or vegetable fat, from about 50 to about 90 parts of amylaceous material, up to 12 parts of sugars, and added water up to a water content of from about 11% to about 19% by weight of the mixture, thus obtaining a rope of a thermoplastic mass having a porous texture, cutting the rope into pieces and optionally drying them.

The mixture can be prepared by first mixing together the powdery components to obtain a dry mix and then mixing the dry mix and the liquid or fluid components.

This mixing step is carried out in a first mixing section of a traditional food extruder, preferably a twin screw extruder.

Cooking the mixture is then be carried out in subsequent sections of the extruder where the mixture is heated, compressed and sheared so that it forms a cooked thermoplastic mass.

The thermoplastic mass is extruded by having it pushed by the extruder screw or twin screw through the openings of a die provided for at an end of the extruder.

The die may have one or more circular openings having from about 2 mm to about 5 mm in diameter.

The thermoplastic mass can be expanded by extruding it through the die into an open space at ambiant temperature and at atmospheric pressure.

Water is lost in form of steam escaping the thermoplastic mass during expansion so that the rope thus obtained has a porous texture and may have a water content of from about 5% to less than about 11%, for example.

The rope of expanded thermoplastic mass thus obtained can be cut into pieces by using a two or more blade cutter rotating adjacent to the die openings of the extruder.

Drying the food bar pieces can be carried out on a belt dryer with hot air.

Preferably, the dried pieces are then coated with a sugar solution and dried again. The coating step can be carried out in a tumbler where a sugar solution can be sprayed onto the tumbling pieces, for example.

The sugar solution comprises from about 50% to about 60% sugar, from about 3% to about 10% dextrose, from about 0.5% to about 1.5% oil and from about 10% to about 40%, especially from about 25% to about 35% water. The sugar solution can also include without limitation, cocoa powder, sodium chloride and aroma.

The amount of sugar solution to be used can be such that the weight proportion of coating on the coated pieces is from about 10% to about 40%, preferably from about 15% to about 25%.

The coated pieces can then be finally dried down to a residual water content of about 3% or less, preferably about 2% or less.

Preparing the Binder

As a whole, the binder can include, in parts by weight, from about 10 to about 70 parts of sugars, from about 5 parts to about 30 parts of humectants, from about 5.5 to about 27.5 parts of nonfat milk solids, from about 10 to about 35 parts of milk fat and/or vegetable fat, up to 10 parts of cocoa powder, up to about 5 parts of emulsifier and added water up to a water content of from about 5% to about 15%.

The binder can be prepared by mixing together its dry components in powdered form with its fluid components in liquid form.

Milk solids which can be optionally included into the binder can be incorporated in the form of fresh milk, condensed milk and/or of milk powder.

Water can be added as such, as water contained in condensed milk or as water contained in fresh milk.

Sugar can be added as such and/or as sugar contained, for example, in sweetened condensed milk.

A preferred binder comprises condensed sweetened milk, in an amount of from about 20 to about 45 parts by weight, for example. In this case, the binder can be prepared by mixing the components in a double walled tank while heating to a temperature of from 105° C. to 117° C., thus concentrating the mixture up to a dry matter content of from 80% to 95%, preferably of from 90% to 92%, and then cooling down to a temperature in a range of from about 33° C. to about 80° C.

Mixing Particles and Binder

A dry mix of particles can be prepared and mixed with the binder in a flowable state, namely at a temperature such that the fat components are in a liquid state, especially at a temperature of from about 33° C. to about 80° C.

Mixing particles and binder can be carried out by means of any gentle, especially continuous mixer which does not damage the cereal particles, such as a screw mixer of the helical spring type with an axial sprinkling nozzle, a coating drum or a paddle mixer.

The dry mix and the binder can be mixed at a rate of about 40 to about 70 parts by weight of dry mix and about 60 parts to about 30 parts by weight of binder, while optionally adding thereto additional cereals, fruits having an adequate water activity (Aw) or nuts, for example.

The mass thus obtained preferably has an Aw of from 0.1 to 0.5 (water content of from 1 to 7%), and more preferably an Aw of from 0.1 to 0.3 (water content of from 1 to 3%).

Shaping the Bar

The flowable mass obtained above can be formed into a bar shape by sheet-cutting, sheet-moulding, moulding or pressing through an opening and cutting.

The ready-to-eat food bar may then be coated with a sweet coating such as a chocolate coating or a coating reminiscent of white chocolate such as a mixture of a milk powder and fat, for example. The bar thus coated can be finally provided with any decorating usual in the confectionary art.

The ready-to-eat food bar can be conditioned in a packing providing for its protection against humidity, such as a packing made of a film with aluminum foil, or a metallised foil.

The following example is given as illustration of a preferred embodiment of the ready-to-eat food bar and of the process for its manufacture according to the present invention. This example is not intended in any way to limit the scope of the invention which is defined in the appended claims. The parts and percentages are by weight.

EXAMPLE

A ready-to-eat food bar having particles of a cooked-extruded wheat base was manufactured by first preparing, a mixture which had the following composition, (in parts, except added water):

| | |
|---|---|
| wheat flour | 41 |
| wheat starch | 18 |
| oat flour | 9 |
| wheat bran | 9 |
| calcium carbonate | 0.5 |
| added water, up to a water content of | 19% |

In preparing the mixture, the powders were first mixed together to obtain a dry mix. The dry mix and added water were then mixed together in the extruder. The mixture obtained in this way was cooked-extruded-expanded with the aid of a BC-45H type CLEXTRAL twin screw extruder having a screw diameter of 55 mm and a total processing length of 800 mm.

Cooking-extruding was carried out at 150° C. under 100 bar for 30 seconds, the two intermeshing screws rotating at 300 rpm. The cooked thermoplastic mass obtained in this way was extruded through a die having eight circular openings of 3 mm in diameter.

The thermoplastic mass was extruded into ambiant air and immediately cut with a two blade cutter rotating adjacent to the opening at 2000 rpm.

The particles of cooked-extruded-expanded wheat base obtained in this way expanded after cutting so that they were about 5 mm in diameter. They had a water content of about 10.6%.

The particles were then dried with hot air on a belt dryer to a residual water content of about 2.9%.

The dried pieces were coated with a sugar solution in a tumbler.

The sugar solution comprised about 59% sugar, about 10% dextrose, about 1% oil and about 30% water.

The amount of sugar solution used was such that the weight proportion of coating on the coated pieces was about 20%.

The coated particles were then finally dried down to a residual water content of about 2%.

A binder was prepared which had the following composition (parts):

| | |
|---|---|
| skim milk powder | 12.5 |
| glucose syrup | 9.4 |
| sorbitol syrup | 7.2 |
| invert sugar | 11.5 |
| condensed sweetened milk (29% water, 43% sugar) | 33.5 |
| sodium chloride | 0.3 |
| hydrogenated vegetable fat (melting point 39° C.) | 13.4 |
| mixture of vegetable mono and diglycerides | 0.6 |
| Glycerine | 6.7 |
| Water | 5.0 |

In preparing the binder, the components were mixed together in a double walled tank while being heated to 114° C. until the mixture was concentrated up to a dry matter content of 91%. The binder was then cooled down to a temperature of 75° C.

50 parts of particles of a cooked-extruded wheat base and 50 parts of binder were gently mixed by means of a mixer of the helical spring type.

The mass thus obtained was formed into a bar shape by sheeting down to a thickness of 1 cm and cutting individual bars 3 cm in width and 10 cm in length.

The bars had a water content of 5.3% and an Aw value of 0.35.

The bars had a soft texture while retaining the crunchiness of the cooked-extruded-expanded wheat base. They had an appetizing taste and could be eaten as they were. They were nutritionally valuable, each individual bar representing a complete meal just as it was.

Thus, while we have described what are the preferred embodiments of the present invention, further changes and modifications can be made by those skilled in the art without departing from the true spirit of the invention, and it is intended to include all such changes and modifications as come within the scope of the claims set forth below.

What is claimed is:

1. A process for manufacturing a ready-to-eat food bar, comprising:

preparing a dry mixture of particles of one or more cooked cereal bases, the bases comprising amylaceous materials;

mixing the dry mixture with a binder to form a mass, the binder comprising sugars, milk solids, humectants and fat, wherein the binder comprises, in parts by weight, from about 10 parts to about 70 parts of sugars, from about 5 to 30 parts of humectants, from about 5.5 to about 27.5 parts of nonfat milk solids, from about 10 parts to about 35 parts of milk fat or vegetable fat, up to about 10 parts of cocoa powder, up to about 5 parts of emulsifier and added water up to a water content of from about 5% to about 15%; and forming the mass thus obtained into a bar shape.

2. The process according to claim 1, wherein the cooked cereal bases further comprise milk solids.

3. The process according to claim 1, whereby the particles of cooked cereal bases are rolled cereals, gun puffed grains, cereal flakes or cooked-extruded cereals.

4. The process according to claim 3, wherein the cooked-cereals are prepared by the following steps:

cooking-extruding-expanding at about 120° C. to about 170° C. under from about 40 bar to about 160 bar for about 5 seconds to 50 seconds a mixture comprising, in parts by weight, up to about 27.5 parts of nonfat milk solids, up to about 12.5 parts of milk fat or vegetable fat, from about 50 to about 90 parts of amylaceous material, up to about 12 parts of sugars, and added water up to a water content of from about 11% to about 19% by weight of the mixture to form the mixture into a rope of a thermoplastic mass having a porous texture and cutting the rope into pieces with optional drying of the pieces.

5. The process according to claim 4, further comprising coating the dried pieces with a sugar solution and drying the sugar coated pieces.

6. The process according to claim 5, wherein the sugar solution comprises from about 50% to about 60% sugar, from about 3% to about 10% dextrose, from about 0.5% to about 1.5% oil and from about 10% to 40% water.

7. The process according to claim 1, wherein the milk solids are incorporated into the binder in form of fresh milk, condensed milk or milk powder.

8. The process according to claim 1, wherein the binder comprises condensed sweetened milk in an amount of from about 20 to about 45 parts by weight.

9. The process according to claim 1, wherein the binder is prepared by mixing the components in a double walled tank while heating to a temperature of from about 105° C. to about 117° C., thereby concentrating the mixture up to a dry matter content of from about 80% to 95% and then cooling down to a temperature in a range of from about 33° C. to about 80° C.

10. A process for manufacturing a ready-to-eat food bar, comprising:

cooking-extruding-expanding at about 120° C. to about 170° C. under from about 40 bar to about 160 bar for about 5 seconds to 50 seconds a mixture comprising, in parts by weight, up to about 27.5 parts of nonfat milk solids, up to about 12.5 parts of milk fat or vegetable fat, from about 50 to about 90 parts of amylaceous material, up to about 12 parts of sugars, and added water up to a water content of from about 11% to about 19% by weight of the mixture;

forming the mixture into a rope of a thermoplastic mass having a porous texture;

cutting the rope into pieces, with optional drying of the pieces to prepare a dry mixture of particles, mixing the dry mixture with a binder to form a mass, the binder comprising sugars, milk solids, humectants and fat wherein the binder comprises, in parts by weight, from about 10 parts to about 70 parts of sugars, from about 5 to 30 parts of humectants, from about 5.5 to about 27.5 parts of nonfat milk solids, from about 10 parts to about 35 parts of milk fat or vegetable fat, up to about 10 parts of cocoa powder, up to about 5 parts of emulsifier and added water up to a water content of from about 5% to about 15%; and forming the mass thus obtained into a bar shape.

11. The process according to claim 10, further comprising coating the pieces with a sugar solution and drying the sugar coated pieces.

12. The process according to claim 11, wherein the sugar solution comprises from about 50% to about 60% sugar, from about 3% to about 10% dextrose, from about 0.5% to about 1.5% oil and from about 10% to 40% water.

13. The process according to claim 10, wherein the milk solids are incorporated into the binder in form of fresh milk, condensed milk or milk powder.

14. The process according to claim 10, wherein the binder comprises condensed sweetened milk in an amount of from about 20 to about 45 parts by weight.

15. The process according to claim 10, wherein the binder is prepared by mixing the components in a double walled tank while heating to a temperature of from about 105° C. to about 117° C., thereby concentrating the mixture up to a dry matter content of from about 80% to 95% and then cooling down to a temperature in a range of from about 33° C. to about 80° C.

16. A process for manufacturing a ready-to-eat food bar, comprising:

cooking a mixture at about 120° C. to about 170° C. under from about 40 bar to about 160 bar for about 5 seconds to 50 seconds, a mixture comprising, in parts by weight, up to about 27.5 parts of nonfat milk solids, up to about 12.5 parts of milk fat or vegetable fat, from about 50 to about 90 parts of amylaceous material, up to about 12 parts of sugars, and added water up to a water content of from about 11% to about 19% by weight of the mixture;

extruding the mixture into an expanded rope of a thermoplastic mass having a porous texture;

cutting the rope into pieces, with optional drying of the pieces to prepare a dry mixture of particles, mixing the dry mixture of particles with a binder to form a mass, the binder comprising sugars, milk solids, humectants and fat wherein the binder comprises, in parts by weight, from about 10 parts to about 70 parts of sugars, from about 5 to 30 parts of humectants, from about 5.5 to about 27.5 parts of nonfat milk solids, from about 10 parts to about 35 parts of milk fat or vegetable fat, up to about 10 parts of cocoa powder, up to about 5 parts of emulsifier and added water up to a water content of from about 5% to about 15%; and forming the mass thus obtained into a bar shape.

* * * * *